(12) United States Patent
Chiang

(10) Patent No.: US 8,897,263 B2
(45) Date of Patent: Nov. 25, 2014

(54) INTERACTIONS AMONG MOBILE DEVICES IN A WIRELESS NETWORK

(71) Applicant: Mung Chiang, Cherry Hill, NJ (US)

(72) Inventor: Mung Chiang, Cherry Hill, NJ (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/655,471

(22) Filed: Oct. 19, 2012

(65) Prior Publication Data

US 2013/0045739 A1 Feb. 21, 2013

Related U.S. Application Data

(62) Division of application No. 12/358,253, filed on Jan. 23, 2009, now Pat. No. 8,306,013.

(51) Int. Cl.
  *H04W 4/00* (2009.01)
  *H04W 56/00* (2009.01)
  *H04W 8/24* (2009.01)

(52) U.S. Cl.
  CPC ............ *H04W 56/0045* (2013.01); *H04W 8/24* (2013.01)
  USPC ......................................... 370/331; 455/435.1

(58) Field of Classification Search
  USPC ................................ 370/350, 331; 455/435.1
  See application file for complete search history.

(56) References Cited

U.S. PATENT DOCUMENTS

| | | | |
|---|---|---|---|
| 5,689,502 A | 11/1997 | Scott | |
| 8,306,013 B2 | 11/2012 | Chiang | |
| 2002/0024973 A1 | 2/2002 | Tavana et al. | |
| 2002/0191561 A1* | 12/2002 | Chen et al. | 370/331 |
| 2003/0119496 A1 | 6/2003 | Gaal et al. | |
| 2005/0097356 A1* | 5/2005 | Zilliacus et al. | 713/201 |
| 2005/0137961 A1 | 6/2005 | Brann et al. | |
| 2007/0133491 A1 | 6/2007 | Ushiki et al. | |
| 2008/0176588 A1* | 7/2008 | Ashdown et al. | 455/466 |
| 2009/0080406 A1 | 3/2009 | Gopal et al. | |
| 2011/0092207 A1* | 4/2011 | Motohashi et al. | 455/435.1 |

OTHER PUBLICATIONS

H. Schulzrinne, S. Casner, R. Frederick, V. Jacobson, RTP: A Transport Protocol for Real-Time Applications, Jul. 2003, p. 1-105 (http://tools.ietf.org/html/rfc3550 2003).

http://www.h323forum.org/ (H.323 Forum), May 15, 2010.

C. Perkins, Ed., IP Mobility Support for IPv4, Aug. 2002, p. 1-100 (http://tools.ietf.org/html/rfc3344 2002).

Rosengerg J. et al., "SIP: Session Initiation Protocol", The Internet Society, IETF Request for Comments:3261, Jun. 2002, pp. 1-269, http://222.ietf.org/rfc/rfc3261.txt.

\* cited by examiner

*Primary Examiner* — Sai-Ming Chan
(74) *Attorney, Agent, or Firm* — Ren-Sheng International

(57) ABSTRACT

One embodiment of the disclosure sets for a method for synchronizing multiple mobile devices in a wireless network, which includes the steps of calculating a time interval for a first mobile device to respond to a request, receiving timing information of the first mobile device, determining a first offset associated with the first mobile device based on the time interval and the timing information, receiving a first data stream including the timing information of the first mobile device, and inserting a first dataset into the first data stream based on the first offset before transmitting the first data stream.

15 Claims, 8 Drawing Sheets

800 A computer program product 802 at least one of one or more instructions for sending data to a first mobile device ;

one or more instructions for calculating a time interval based on information received from the first mobile device in response to the data ;

one or more instructions for requesting a time information of the first mobile device;

one or more instructions for determining a first offset associated with the first mobile device based on the time interval and the time information;

one or more instructions for receiving a media stream embedding a timestamp information associated with the time information of the first mobile device; or one or more instructions for inserting a first dataset to the media stream based on the offset

| 804 signal bearing medium | 808 a computer readable medium |
|---|---|
| 806 communication medium | 810 a recordable medium |

FIG. 8

INTERACTIONS AMONG MOBILE DEVICES IN A WIRELESS NETWORK

CROSS-REFERENCE TO RELATED APPLICATIONS

The present application is a divisional application of U.S. Nonprovisional application Ser. No. 12/358,253, filed on Jan. 23, 2009 and entitled "INTERACTIONS AMONG MOBILE DEVICES IN A WIRELESS NETWORK." The U.S. Nonprovisional Application, including any appendices or attachments thereof, is incorporated by reference herein in its entirety.

BACKGROUND

Description of the Related Art

Unless otherwise indicated herein, the approaches described in this section are not prior art to the claims in this application and are not admitted to be prior art by inclusion in this section.

In a network, various types of data can be exchanged between two devices, such as text data, audio data, or video data. For example, video data and audio data can be exchanged between two computers in video calls; text data can be exchanged between a computer and a cellular phone in text messages; and audio data can be exchanged between two cellular phones in voice calls.

In some circumstances, data can be exchanged among more than two devices in a wireline network. For example, audio and video data can be exchanged among more than two devices in a video conference via a wireline network. However, conducting the same data exchanges in a wireless network is likely to be challenging. For example, as a device moves, it is assigned different identification information at different locations in the wireless network. The quality or even the availability of the connection to the wireless network for the device also varies. As a result, the inherent mobile nature of the devices in a wireless network further exacerbate several long existing issues for real time applications operating on a data network.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 8 is a block diagram illustrating a computer program product for transmission data among mobile devices in a wireless network, according to one embodiment of the disclosure.

Use of the same reference numbers in different figures indicates similar or identical elements.

DETAILED DESCRIPTION

Figure 1:
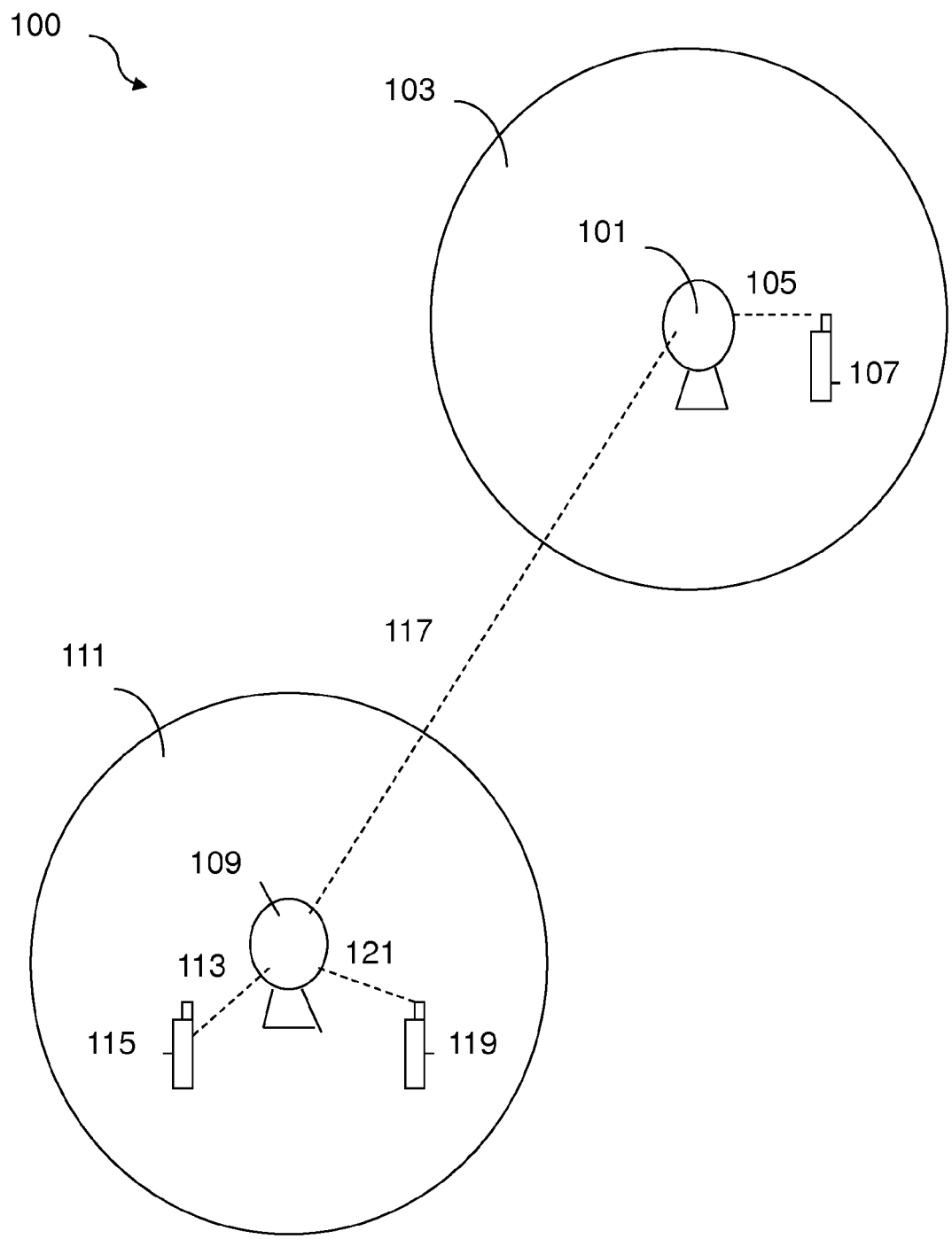
FIG. 1 illustrates a wireless network environment supporting interactions among mobile devices, according to one embodiment of the disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to information transmission among mobile devices in a wireless network.

Throughout this disclosure, the term "wireless network" broadly refers to a network whose interconnections between nodes are implemented without the use of wires. A "node" is an electronic device as a unit in a network, and is capable of transmitting, receiving, and/or forwarding information.

In a wireless network, data can be exchanged between a mobile device and a stationary device, between two stationary devices, and also between two mobile devices. A mobile device can be, for example, a cell phone, a smart phone, a laptop computer, a personal digital assistant (PDA), and a portable media player with wireless connectivity. A stationary device can be, for example, a base station or a switch.

FIG. 1 illustrates a wireless network environment 100 for supporting interactions among mobile devices, according to one embodiment of the disclosure. The wireless network environment 100 may include a cellular network, a Wi-Fi network, or other types of wireless networks. A stationary device 101 is configured to cover a wireless range 103, in which the stationary device 101 can establish a wireless connection 105 with a mobile device 107. After the establishment of the wireless connection 105, data can be exchanged between the stationary device 101 and the mobile device 107 through the connection. The data may include, without limitation, time stamp information, identification information, status information, location information, audio data, and video data. Similarly, a stationary device 109 is configured to cover a wireless range 111, in which the stationary device 109 can establish a wireless connection 113 and a wireless connection 121 with a mobile device 115 and a mobile device 119, respectively. The stationary device 101 and the stationary device 109 may exchange data via a connection 117.

In one implementation, the data exchanged among the mobile devices 107, 115, and 119 includes textual data and non-textual data, such as audio data and video data. Especially for an interactive application involving the exchange of audio data and video data, such as video conferencing, the timing associated with capturing the data and presenting the data can be important. A device outputting data is referred to as a presentation device, which may include a display and a speaker. A device capturing the data is referred to as a capture device, which may include a camera and a microphone. Often, a mobile device can be both a presentation device and a capture device.

The audio data and/or the video data can be transmitted in a form of a data stream. A device transmitting the data is referred to as a transmitting device, and a device receiving the data is referred to as a receiving device. Timing information, which may refer to the clock information of the transmitting device, may be embedded in the stream. In one implementation, the embedded timing information is used to synchronize the audio data and the video data.

However, in a wireless network environment, such as the wireless network environment 100, each device has its own clock. Therefore, even though the mobile device 107 may capture a first audio data at the same time as the mobile device 119 capturing a second audio data, the time stamps associated with the first audio data and the second audio data may still be different. One cause for the difference is a skew between the clock of the mobile device 107 and the clock of the mobile device 119. The skew between the clock of the stationary device 101 and the clock of the stationary device 109 may also cause the difference.

A synchronization mechanism can be used to compensate for the time offsets among the stationary devices and mobile devices in the wireless network environment 100. One way to synchronize among the different data streams in the environment is to insert a dataset, for example, a delay signal, in some of the data streams.

In addition, depending on the distance between a stationary device and one of the mobiles devices covered within the wireless range of the stationary device, a variable round-trip time for data transmission between one of the mobile devices and the stationary device can be established. In one implementation, the variable round-trip time may be considered in the synchronization mechanism.

Figure 2:
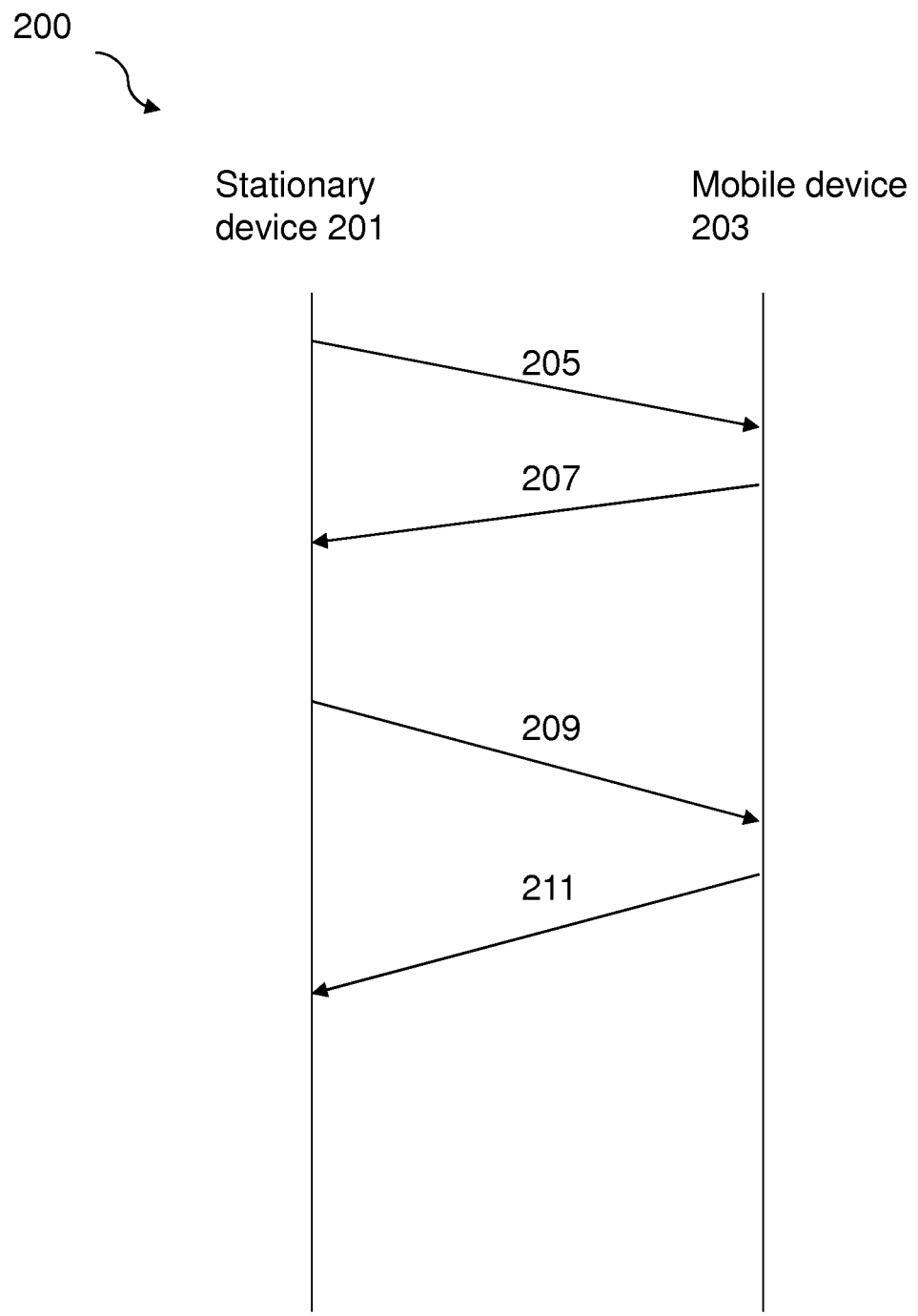
FIG. 2 is a timing diagram illustrating a simplified synchronization process between a mobile device and a stationary device, according to one embodiment of the disclosure.

FIG. 2 is a timing diagram illustrating a synchronization process 200 between a mobile device and a stationary device, according to one embodiment of the disclosure. A stationary device 201 pings a mobile device 203 in step 205, and the mobile device 203 sends an acknowledgement to the stationary device 201 in response to the ping in step 207. The stationary device 201 can then calculate a round-trip time between the initial ping from the stationary device 201 and the subsequent acknowledge from the mobile device 203.

In step 209, the stationary device 201 sends a request to the mobile device 203 to request for the time of the mobile device 203. In step 211, the mobile device 203 sends a time stamp to the stationary device 201 in response to the request. In one implementation, the time stamp here refers to the time at which the mobile device 203 transmits the response. With the various timing information, such as the time stamp associated with the stationary device 201, the time stamp of the mobile device 203, and the round-trip time between the stationary device 201 and the mobile device 203, the stationary device 201 can calculate a time offset between the stationary device 201 and the mobile device 203. Similarly, the stationary device 201 can communicate with other mobile devices within the wireless range of the stationary device 201 and determine the time offset between the stationary device 201 and any one or plurality of such mobile devices. As an illustration, suppose the time stamp of the stationary device is T; the time stamp of the mobile device is t; and the round-trip time is RTT. The time offset between the stationary device 201 and the mobile device 203 can be T+0.5RTT−t.

Moreover, the stationary device 201 can notify another stationary device about the time offset existing between the stationary device 201 and one or a plurality of the mobile devices covered by the stationary device 201. In addition, the stationary device 201 can communicate with other stationary devices to determine time offsets among the stationary devices using the same or similar approach set forth above.

Referring back to FIG. 1, in one implementation, the stationary device 101 calculates a first time offset between the stationary device 101 and the mobile device 107, and the stationary device 109 calculates a second time offset between the stationary device 109 and the mobile device 115 and a third time offset between the stationary device 109 and the mobile device 119. Then, the stationary device 101 and the stationary device 109 can communicate with each other to determine a fourth time offset between them. In addition, the stationary device 101 can notify the stationary device 109 the first time offset, and the stationary device 109 can notify the stationary device 101 the second time offset and the third time offset With the time offset information, the stationary device 101 and the stationary device 109 may manage their buffers to synchronize the audio data and video data received from the mobile devices 107, 115, and 119 before forwarding the synchronized audio and video data to the mobile devices. In one implementation, the stationary device 101 and/or the stationary device 109 may insert a dataset into a media stream, such as the audio data stream, the video data stream, or a combination of the two streams. The dataset may be a delayed signal.

Figure 3:
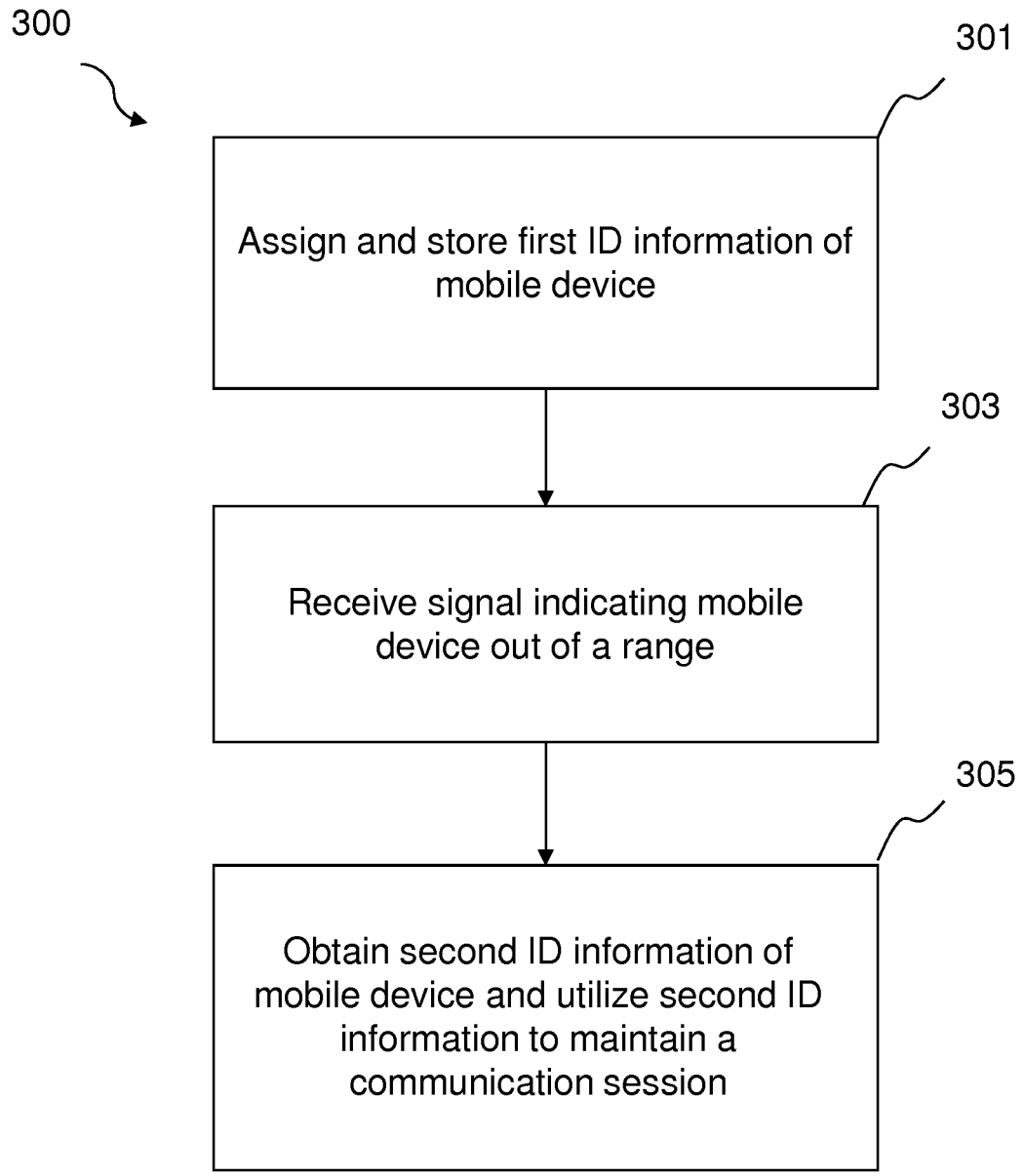
FIG. 3 is a flowchart of a method for maintaining a communication session of a mobile device even as the mobile device moves away from an originally connected stationary device, according to one embodiment of the disclosure.

In addition to the synchronization of mobile devices, the mobility of mobile devices is also considered for enabling an interactive application, such as video conferencing, to operate in a wireless network environment. In particular, FIG. 3 is a flowchart 300 of a method for maintaining a communication session of a mobile device even as the mobile device moves away from an originally connected stationary device, according to one embodiment of the disclosure. Suppose the wireless network environment is a cellular network. In one implementation, the connection between the mobile device and the originally connected stationary device in a first cell changes to a connection between the mobile device and another stationary device in a second cell without terminating the connection between the mobile device and the cellular network.

Before going into the detailed discussions of FIG. 3, it should be noted that a mobile device goes through a registration process before gaining access to a wireless network in one implementation. The mobile device may first register itself to a first stationary device covering a first wireless range after the mobile device is in the first wireless range. When the mobile device leaves the first wireless range and enters a second wireless range covered by a second stationary device, the mobile device may register itself to the second stationary device. Also, the mobile device may be assigned different identification information by the different stationary devices after the mobile device completes registration. In one implementation, the identification information assigned by the first stationary device is referred to as a home IP address of the mobile device. The identification information assigned by another stationary device that subsequently handles the registration of the mobile device, such as a second stationary device, is referred to as a guest IP address of the mobile device. In another implementation, in a wireless network, a mobile device is pre-configured with its home IP address, and its guest IP address changes based on the location of the mobile device. The identification information, such as the home IP address and the guest IP address, may be stored in a database in each of the stationary devices or in a switch center controlling the stationary devices across the backbone of the wireless network.

The identification information can be used to provide mobility support in a wireless network. To illustrate, in one implementation, the home IP address and the guest IP address associated with a mobile device are both stored in a database of a switch center, which controls stationary devices such as the first stationary device and the second stationary device. After the mobile device moves into the wireless range of the second stationary device and registers with the secondary stationary device, if the first stationary device receives a packet destined for the mobile device, even though the mobile device is no longer in the wireless range of the first stationary device, the first stationary device, in one implementation, is able to access the guest IP address of the mobile device via the switch center and appends a new IP header with the guest IP address in the packet and forwards the packet to the second stationary device. At the second stationary device, the new IP header is removed and the packet is transmitted to the mobile device based on the home IP address of the mobile device.

In one implementation, the second identification information is reflective of the location of the mobile device and may be used in a signaling protocol to establish a communication session, such as a video conference session, in a wireless network. One example of the signaling protocol is the Session Initiation Protocol (SIP).

Referring back to the flowchart 300 of FIG. 3, in step 301, a first stationary device assigns a first identification information (e.g., home IP address) to a mobile device and stores the first identification information in a database. The database can be at the first stationary device or at a switch center controlling the first stationary device. The database can be accessed by a second stationary device controlled by the same switch center.

In step 303, the first stationary device receives a signal indicating that the mobile device has left the first wireless range covered by the first stationary device. The first stationary device sends a request to access the database to retrieve information associated with the first identification information.

When the mobile device moves away from the first wireless range and enters the second wireless range covered by the second stationary device, the mobile device registers itself to the second stationary device, and the second stationary device assigns a second identification information (e.g., guest IP address) to the mobile device. Since the mobile device is associated with both the first identification information and the second identification information, the second stationary device in one implementation can store the first identification information, the second identification information, and the relationship of the two identification information (e.g., both are for the same mobile device) to the database.

In step 305, the first stationary device obtains the second identification information, which is associated with the first identification information, from the database and utilizes the second identification information in a signaling protocol to maintain a communication session with the mobile device.

Figure 4:
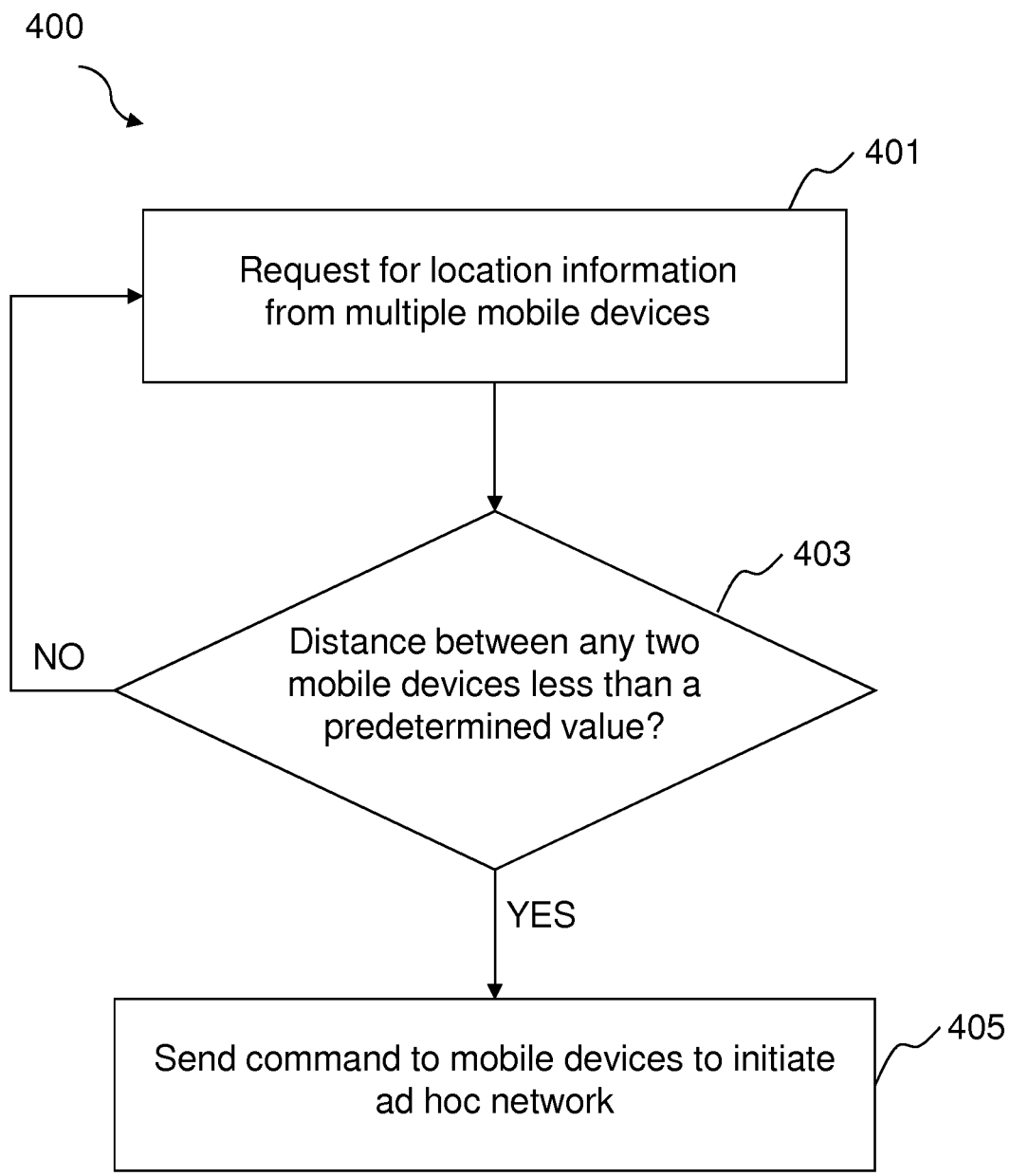
FIG. 4 is a flowchart of a method for establishing an ad hoc network among mobile devices, according to one embodiment of the disclosure.

As a mobile device moves, it may move to be in proximity to other mobile devices. When a plurality of mobile devices are geographically closed to each other, the mobile devices may form an ad hoc network for direct communication among the mobile devices without relying a stationary device to relay data. FIG. 4 is a flowchart 400 of a method for establishing an ad hoc network among mobile devices, according to one embodiment of the disclosure.

In step 401, a stationary device requests for location information from each of the mobile devices within a wireless range covered by the stationary device. The location information of the mobile devices can be determined by, for example, a Global Positioning System (GPS). In step 403, after receiving the location information of multiple mobile devices within the wireless range, the stationary device determines whether the distance between any two mobile devices is smaller than a predetermined value. If yes, in step 405, the stationary device sends a command to the mobile devices causing the mobile devices to initiate an ad hoc network. If not, then the method goes back to step 401. In an ad hoc network, each node is capable of forwarding data to other nodes, and there is no centralized node. When the distance between any two mobile devices is greater than the predetermined value, a handoff from the mobile devices leaving the wireless range to a stationary device may take place, and the leaving mobile device may disconnect from the ad hoc network.

Figure 5:
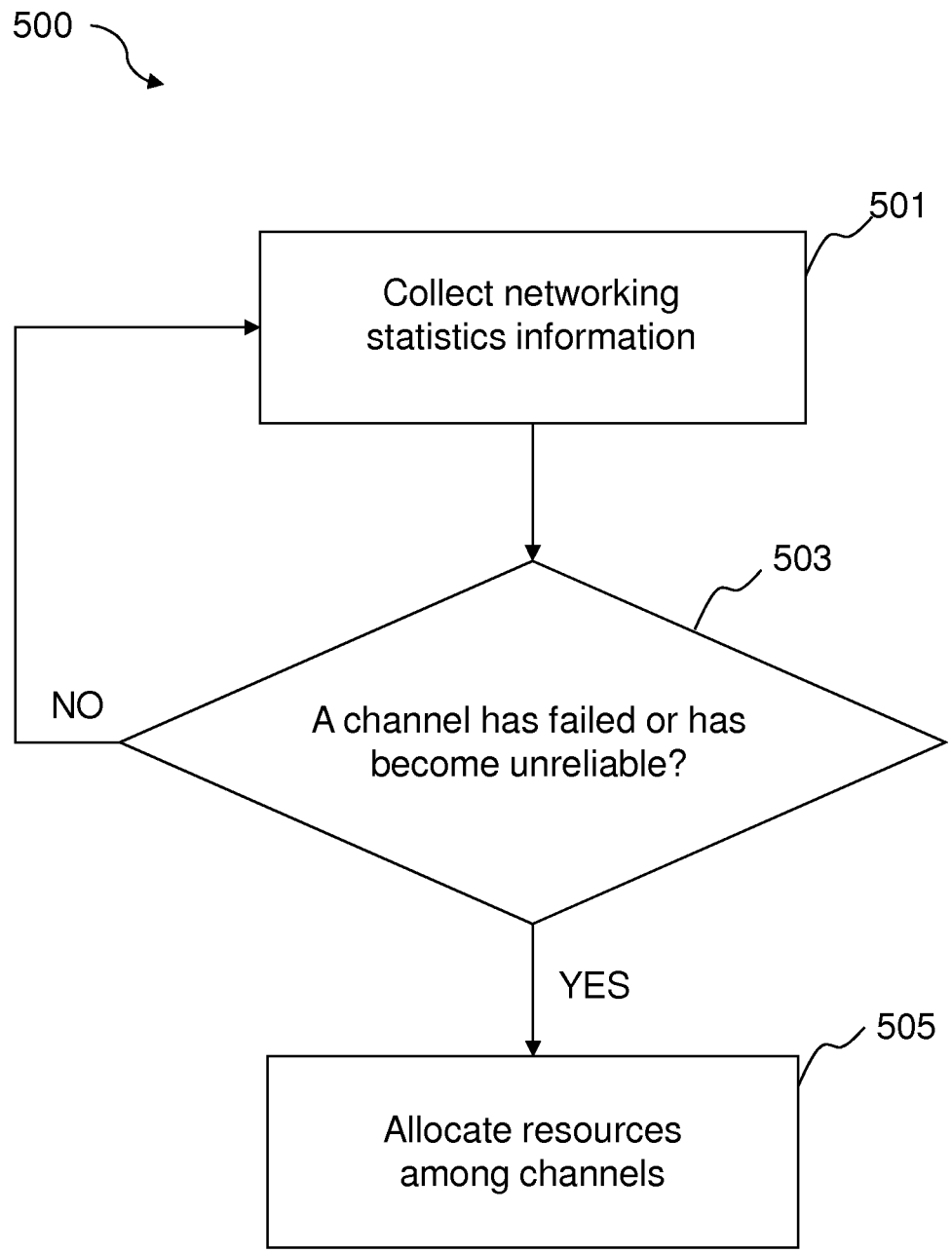
FIG. 5 is a flowchart of a method for allocating resources among communication channels for mobile devices, according to one embodiment of the disclosure.

Irrespective of whether data is transferred through stationary devices or an ad hoc network, a wireless network can include multiple connections among stationary devices and mobile devices, and the efficiency and the quality of the connections may differ depending on the network environment. For example, in a conference call involving multiple mobile devices, each mobile device may communication via a different channel, and the communication quality for each channel of connection may vary. Some connections may be considered to be high quality and experience less delay, while others may be considered to be poor quality and experience significant delay. FIG. 5 is a flowchart 500 illustrating a method for allocating resources among communication channels for mobile devices, according to one embodiment of the disclosure.

In one implementation, a stationary device manages data exchanges with multiple mobile devices. In step 501, a stationary device, such as a switch center or a base station, collects networking statistics information for each channel. The networking statistics information collected may include the link status for each channel, including the number of sending and receiving errors on each channel and/or whether each channel is sending and receiving keep-alive packets.

In step 503, the stationary device can determine whether a channel has failed or has become unreliable based on the collected networking statistics information. In one implementation, a stationary device determines that a channel has failed or has becomes unreliable when a predetermined percentage of the packets transmitted on the channel is lost. This may be established by comparing between the number of packets sent by a mobile device connected to the stationary device via the channel and the number of packets acknowledged to have been received by the stationary device. If the stationary device determines that a channel has failed or has become unreliable, then the method goes to step 505. If not, then the method goes to step 501.

In step 505, the stationary device allocates resources among the channels according to the collected networking statistics information. For example, a switch center may analyze the networking statistics information, such as the packet loss rate, for channels used by the mobile devices within the coverage of the switch center, and determine that some of them are losing significant number of packets and suffering excessive delay. In one implementation, the switch center identifies the base station managing such mobile devices and instructs the base station to assign a higher priority to the packet transmission for the channels suffering significant delays in a weighted round robin scheduling scheme. In another implementation, the switch center again identifies the appropriate base station and requests the base station to instruct certain mobile devices to transmit at higher power to increase the rate of packet transmission.

Figure 6:
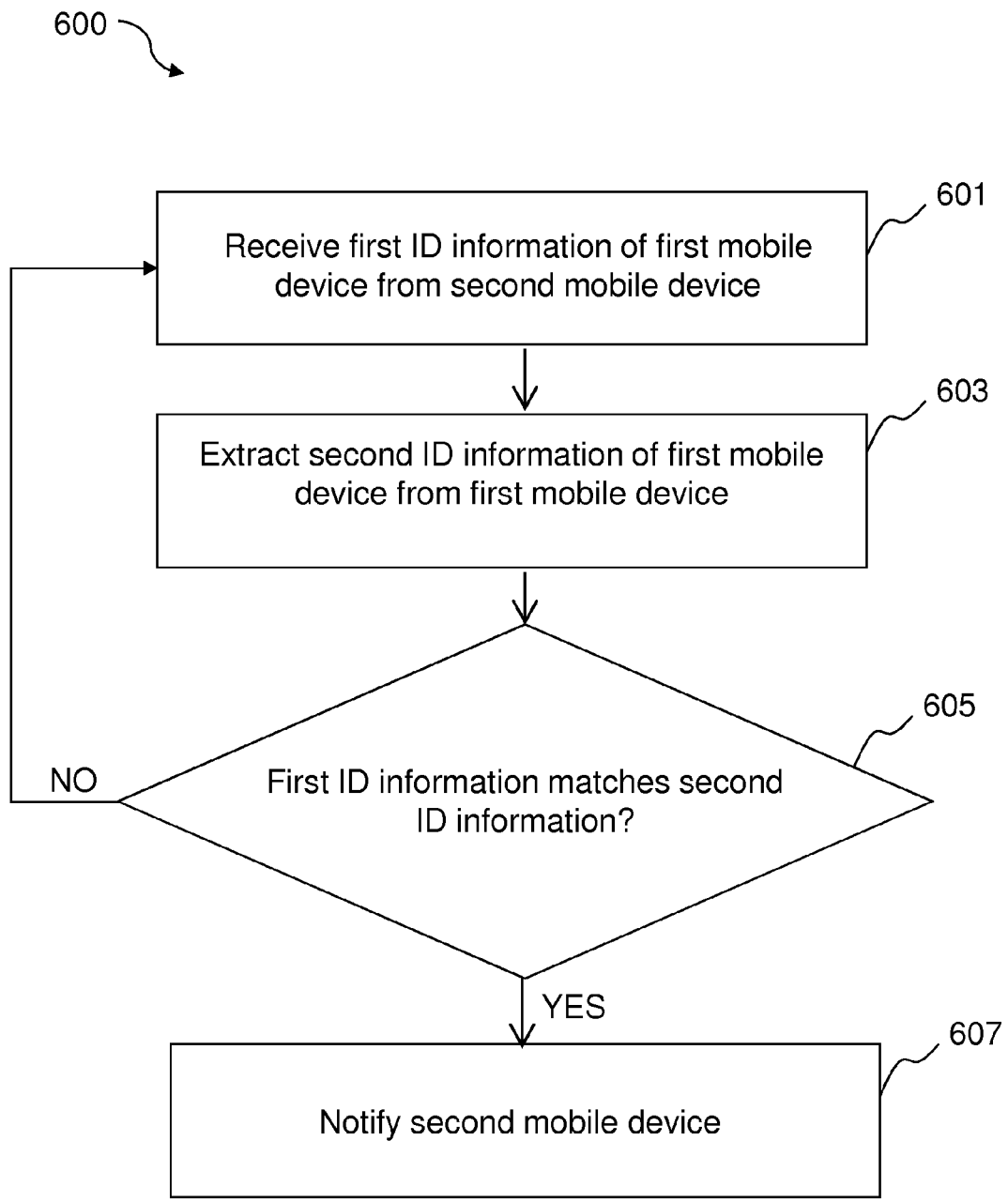
FIG. 6 is a flowchart of a method for monitoring the availability of a mobile device in a wireless network to exchange data, according to one embodiment of the disclosure.

To further enhance the appeal of an interactive application, such as video conferencing, in a wireless network environment, one approach is to permit customization of how the application is used. For example, a mobile device may store a list of identification information representing some preferred mobile devices to exchange data with. So, for a mobile phone, the mobile phone may have a list of phone numbers identifying the other mobile phones that are capable of conducting video calls and are likely to accept an invitation to participate in a video conference. There can be multiple lists, such as a list corresponding to a social network community. FIG. 6 is a flowchart of a method for making use of such a list to monitor the availability of a mobile device in a wireless network to exchange data, according to one embodiment of the disclosure.

Suppose a second mobile device covered by a stationary device has a list of contact information of other mobile devices, including a first mobile device, to conduct a video conferencing session with. In step 601, the stationary device receives a first identification information of the first mobile device from the second mobile device via a wireless network. In one implementation, when the second mobile device registers itself to the stationary device, it can transmit a packet including the first identification information of the first mobile device. An example of the first identification information can be the phone number of the first mobile device, and an example of the list can be a contact list maintained by the second mobile device.

In step 603, the stationary device searches through the mobile devices that are registered and have gained access to the wireless network and extracts certain identification information, such as the phone number, associated with such mobile devices. The identification information extracted from the first mobile device is referred to as a second identification information.

In step 605, the stationary device compares the first identification information with the second identification information to determine whether there is a match between the two identification information. In one implementation, when the first mobile device registers to the stationary device, the stationary device is able to extract the second identification information from the first mobile device. In step 607, if the two identification information matches, then the stationary device notifies the second mobile device that the first mobile device is ready for data exchange. If the two identification information does not match, then the method goes to step 601. With this notification, the second mobile device can, for example, send the first mobile device an invitation to participate in a video conference with confidence that the invitation is likely to be accepted.

Figure 7:
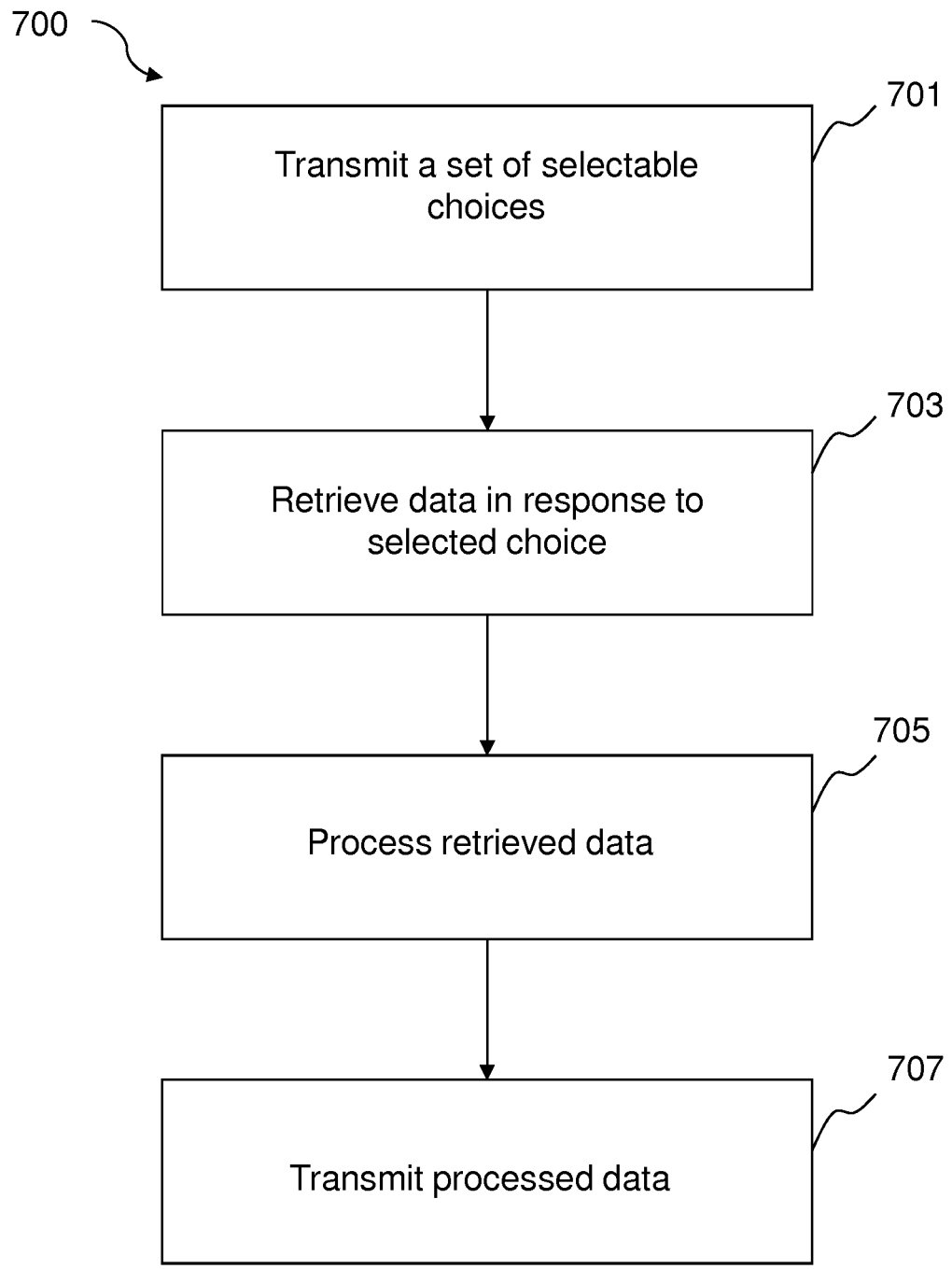
FIG. 7 is a flow chart of a method for processing and displaying data by adapting to certain information associated with a mobile device, according to one embodiment of the disclosure.

Another approach to customize the use of an interactive application, such as video conferencing, in a wireless network environment is to manage the data associated with the application to be processed on a mobile device. Specifically, when mobile devices exchange data among each other, the stationary device can be configured to receive instructions and conditions from one mobile device and relay data to the other mobile devices according to the received information. FIG. 7 is a flow chart of a method for processing and displaying data by adapting to certain information associated with a mobile device, according to one embodiment of the disclosure.

In step 701, a stationary device transmits a set of selectable choices to a first mobile device. For example, the set of selectable choices may be the number of available screens to be displayed on the first mobile device. In one implementation, the number of available screens is associated with the numbers of other mobile devices that are in the same communication session with the first mobile device. The communication session, for example, can be a video conferencing session that involves multiple mobile devices.

In step 703, the stationary device retrieves data in response to a selected choice received from the first mobile device. Suppose there are four mobile devices participating in a communication session, such as a video conference session, and the selected choice is to display data from two of the participating mobile devices. Then, the stationary device retrieves the audio and video data received from the two participating mobile devices, which may have been stored in a memory unit at the stationary device during the communication session.

In step 705, the stationary device processes the retrieved data. For example, the stationary device may process the retrieved data based on instructions and conditions received from the first mobile device. To illustrate, an instruction may refer to the selected choice, and a condition may refer to the resolution of the display for the mobile device. The stationary device may first verify whether the resolution of the display can support the selected number of screens to be displayed. If so, the stationary device may proceed to compress the data associated with the screens to be displayed on the first mobile device. In one implementation, the compression can be done by a transformative coder-decoder. In step 707, the stationary device transmits the processed data to the first mobile device. In the example described above, the processed data refers to the data that are compressed to be suitable for display in windows with reduced sizes on the first mobile device.

FIG. 8 is a block diagram illustrating a computer program product 800 for supporting interactions among mobile devices in a wireless network in one embodiment of the disclosure. Computer program product 800 includes one or more sets of instructions 802 for executing the methods for supporting interactions among mobile devices in a wireless network. For illustration only, the instructions 802 reflect the synchronization methods described above and illustrated in FIG. 2. The instructions 802 may also include, without limitation, the methods illustrated in FIG. 3, FIG. 4, FIG. 5, FIG. 6, and FIG. 7. Computer program product 800 may be transmitted in a signal bearing medium 804 or another similar communication medium 806. Computer program product 800 may be recorded in a computer readable medium 808 or another similar recordable medium 810.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method to maintain a communication session of an interactive application in a wireless network, comprising:
   determining a first identification information associated with a mobile device;
   in response to the mobile device leaving a first wireless range associated with the wireless network, accessing a second identification information associated with the first identification information, wherein the second identification information is assigned to the mobile device when the mobile device is in a second wireless range associated with the wireless network and registers itself to a stationary device covering the second wireless range; and
   maintaining the communication session with the mobile device by utilizing the second identification information in a signaling protocol.

2. The method of claim 1, further comprising:
   assigning the first identification information to the mobile device; and
   receiving a signal indicating that the mobile device is out of the first wireless range.

3. The method of claim 1, further comprising:
   in response to receiving a packet destined for the mobile device when the mobile device is in the second wireless range, appending the second identification information to the packet, wherein the packet includes the first identification information; and
   forwarding the packet based on the second identification information.

4. A non-transitory computer-readable medium containing a sequence of instructions to maintain a communication session of an interactive application in a wireless network having a first computing device and a second computing device, which when executed by the first computing device, causes the first computing device to:
   determine a first identification information associated with a mobile device;
   in response to the mobile device leaving a first wireless range of the first computing device, access a second identification information associated with the first identification information, wherein the second identification information is assigned to the mobile device when the mobile device is in a second wireless range of the second computing device and registers itself to a stationary device covering the second wireless range; and
   maintain the communication session with the mobile device by utilizing the second identification information in a signaling protocol.

5. The computer-readable medium of claim 4, further contains a sequence of instructions, when executed by the first computing device, causes the first computing device to:
   assign the first identification information to the mobile device; and
   receive a signal indicating that the mobile device is out of the first wireless range.

6. The computer-readable medium of claim 4, further contains a sequence of instructions, when executed by the first computing device, causes the first computing device to:
   in response to receiving a packet destined for the mobile device when the mobile device is in the second wireless range, append the second identification information to the packet, wherein the packet includes the first identification information; and
   forward the packet to the second computing device based on the second identification information.

7. A computing device configured to maintain a communication session of an interactive application in a wireless network, the computing device comprises:
   a memory unit; and
   a processing unit, wherein the processing unit is configured to
   determine a first identification information associated with a mobile device,
   in response to the mobile device leaving a first wireless range of the computing device, access a second identification information associated with the first identification information, wherein the second identification information is assigned to the mobile device when the mobile device is in a second wireless range of another computing device in the wireless network and registers itself to the another computing device, and
   maintain the communication session with the mobile device by utilizing the second identification information in a signaling protocol.

8. The computing device of claim 7, wherein the processing unit is further configured to:
   assign the first identification information to the mobile device; and
   receive a signal indicating that the mobile device is out of the first wireless range.

9. The computing device of claim 7, wherein the processing unit is further configured to:
   in response to receiving a packet destined for the mobile device when the mobile device is in the second wireless range, append the second identification information to the packet, wherein the packet includes the first identification information; and
   forward the packet to the another computing device based on the second identification information.

10. The computing device of claim 7, wherein the computing device is a switch center that manages the first wireless range and the second wireless range and associates the first identification information and the second identification information.

11. The computing device of claim 7, wherein the computing device is a base station that associates the first identification information and the second identification information.

12. The method of claim 1, wherein the first identification information is a home Internet Protocol (IP) address, and the second identification information is a guest IP address.

13. The computer-readable medium of claim 4, wherein the first identification information is a home Internet Protocol (IP) address, and the second identification information is a guest IP address.

14. The computing device of claim 7, wherein the first identification information is a home Internet Protocol (IP) address, and the second identification information is a guest IP address.

15. The computing device of claim 11, wherein the base station is configured to retrieve the second identification information from a database controlled by a switch center in the wireless network.

* * * * *